US011475325B2

(12) United States Patent
Weber et al.

(10) Patent No.: US 11,475,325 B2
(45) Date of Patent: Oct. 18, 2022

(54) INFERRING COGNITIVE CAPABILITIES ACROSS MULTIPLE COGNITIVE ANALYTICS APPLIED TO LITERATURE

(71) Applicant: International Business Machines Corporation, Armonk, NY (US)

(72) Inventors: Daniel Weber, Oronoco, MN (US); Nathaniel E. Rykal, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 16/695,384

(22) Filed: Nov. 26, 2019

(65) Prior Publication Data

US 2021/0158184 A1 May 27, 2021

(51) Int. Cl.
| | | |
|---|---|---|
| *G06F 16/24* | (2019.01) | |
| *G06N 5/04* | (2006.01) | |
| *G06F 16/2458* | (2019.01) | |
| *G06F 16/28* | (2019.01) | |
| *G06F 16/2452* | (2019.01) | |
| *G06F 40/30* | (2020.01) | |
| *G06F 40/247* | (2020.01) | |

(52) U.S. Cl.
CPC ............ *G06N 5/04* (2013.01); *G06F 16/2465* (2019.01); *G06F 16/24522* (2019.01); *G06F 16/284* (2019.01); *G06F 40/247* (2020.01); *G06F 40/30* (2020.01)

(58) Field of Classification Search
CPC .............. G06F 16/284; G06F 16/2465; G06F 16/24522
See application file for complete search history.

(56) References Cited

U.S. PATENT DOCUMENTS

| | | | |
|---|---|---|---|
| 9,779,327 B2* | 10/2017 | Allen ................... | G06V 40/174 |
| 9,916,538 B2 | 3/2018 | Zadeh et al. | |
| 10,360,301 B2* | 7/2019 | Allen .................... | G06F 40/216 |
| 10,834,466 B1* | 11/2020 | Breedvelt-Schouten | ................... H04N 21/44222 |
| 11,163,762 B2* | 11/2021 | Arnold ................ | G06F 16/2452 |
| 2017/0084295 A1 | 3/2017 | Tsiartas et al. | |

(Continued)

OTHER PUBLICATIONS

Anonymously, "Method and apparatus for a cognitive configuration management service", IP.com No. IPCOM000248102D, IP.com Electronic Publication Date: Oct. 26, 2016, 5 pages.

(Continued)

*Primary Examiner* — Eliyah S. Harper
(74) *Attorney, Agent, or Firm* — Stephen J. Walder, Jr.; Aaron Pontikos

(57) ABSTRACT

A mechanism is provided to implement an analytic inference engine for inferring cognitive capabilities across multiple cognitive analytics applied to literature. The analytic inference engine receives cognitive analytic output generated by multiple cognitive analytics applied to a portion of content. Response to the analytic inference engine finding a first offset in a first cognitive analytic output matching a second offset in a second cognitive analytic output, the analytic inference engine identifies unique features in the first cognitive analytic output and the second cognitive analytic output with respect to the matching offset. The analytic inference engine generates a composite analytic output comprising the unique features with respect to the matching offset.

20 Claims, 7 Drawing Sheets

(56) References Cited

U.S. PATENT DOCUMENTS

| | | | | |
|---|---|---|---|---|
| 2018/0322436 | A1* | 11/2018 | Sotiroudas | G01N 33/0075 |
| 2019/0171438 | A1* | 6/2019 | Franchitti | G06N 20/00 |
| 2019/0197135 | A1* | 6/2019 | Beymer | G16H 50/70 |
| 2019/0286968 | A1* | 9/2019 | Erpenbach | G06F 40/30 |
| 2020/0065394 | A1* | 2/2020 | Calderon | G06V 40/174 |
| 2020/0159819 | A1* | 5/2020 | Carteri | G06F 16/93 |
| 2020/0234346 | A1* | 7/2020 | Venkateswaran | G06F 8/77 |
| 2020/0250508 | A1* | 8/2020 | De Magalhaes | G16H 50/30 |
| 2021/0134299 | A1* | 5/2021 | Bender | G06N 5/045 |

OTHER PUBLICATIONS

Anonymously, "Method and System for using Cognitive Augmented Text Annotation Generation (CATAG) for Enhancing Text2Speech Process and Service", IP.com No. IPCOM000256912D, IP.com Electronic Publication Date: Jan. 8, 2019, 2 pages.

Anonymously, "OptCare—A system for for personalizing clinical care pathways", IP.com No. IPCOM000244979D, IP.com Electronic Publication Date: Feb. 4, 2016, 13 pages.

Anonymously, , "System and Method for Medical Cognitive Bias Analysis", IP.com No. IPCOM000254978D, IP.com Electronic Publication Date: Aug. 17, 2018, 4 pages.

High, Rob, "The Era of Cognitive Systems: An Inside Look at IBM Watson and How it Works", IBM Corporation, Redbooks, Dec. 12, 2012, 16 pages.

Kerr, Ian B et al., "Clinical and Service Implications of a Cognitive Analytic Therapy Model of Psychosis", The Australian & New Zealand Journal of Psychiatry, 37 (5). Oct. 1, 2013, 10 pages.

Mulder, Roger et al., "Effectiveness of cognitive analytic therapy for personality disorders", The British Journal of Psychiatry, 2013, 3 pages.

Yuan, Michael J. , "Watson and Healthcare, How natural language processing and semantic search could revolutionize clinical decision support", IBM Corporation, developerWorks, http://www.ibm.com/developerworks/industry/library/ind-watson/, Apr. 12, 2011, 14 pages.

* cited by examiner

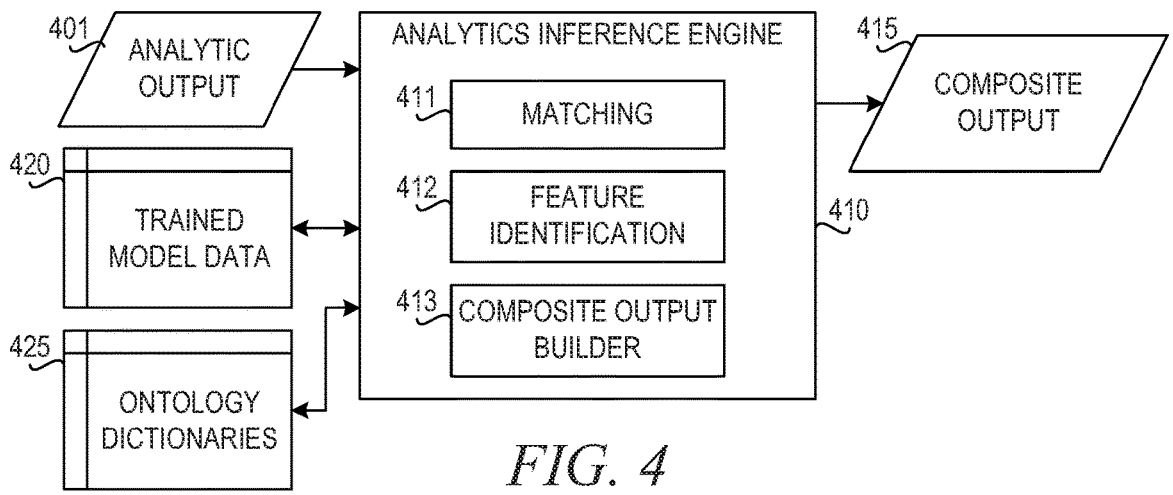
*FIG. 4*
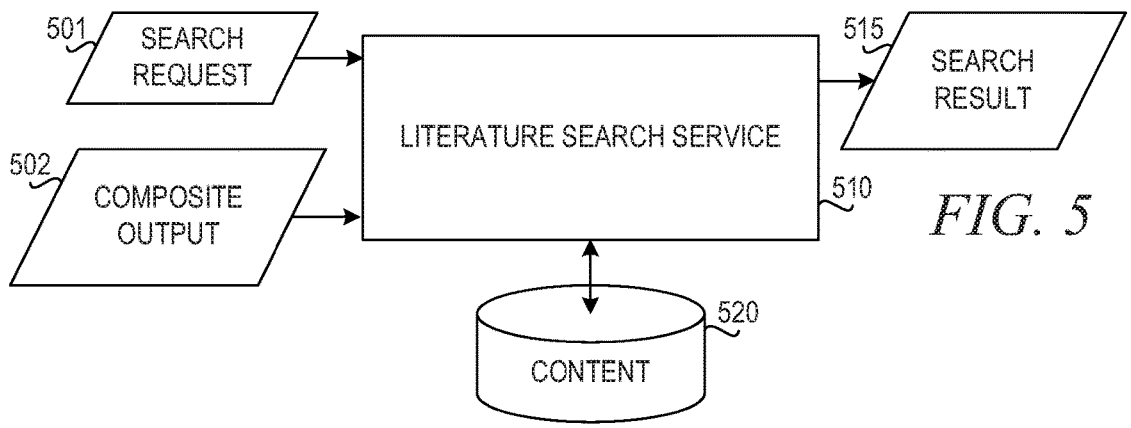
*FIG. 5*
*FIG. 6*
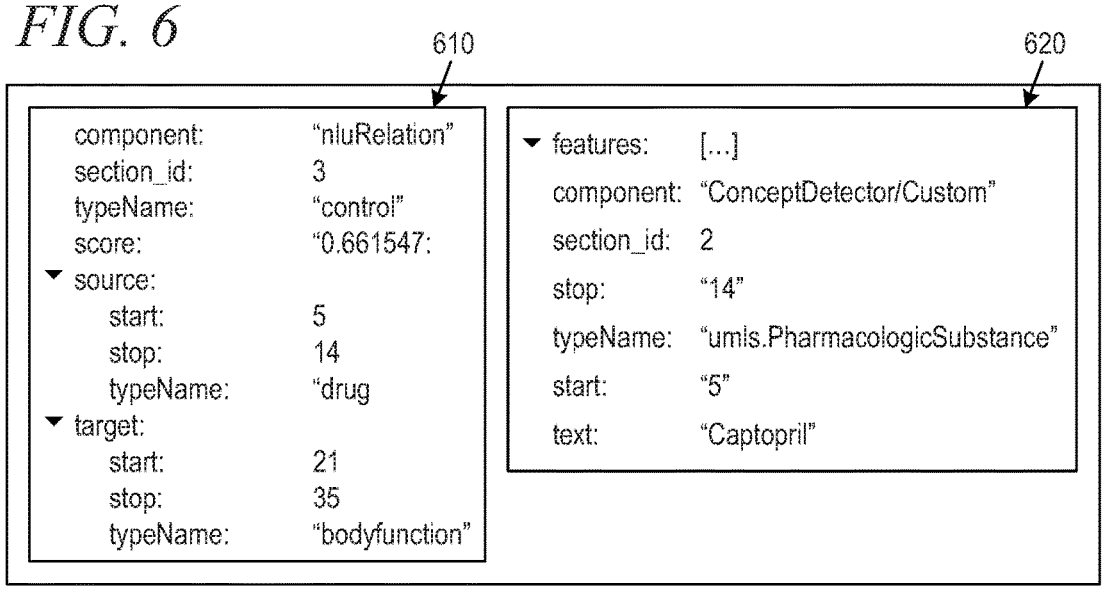

*FIG. 7C*

| COMPOSITE OUTPUT | |
|---|---|
| UID | X2 |
| Name | Mmmmmmm |
| Start | 29 |
| End | 45 |
| Relations | [...] |
| Synonyms | [...] |
| Qualifiers | [...] |
| Definition | Nnnnnnnnn |

*FIG. 8A*

| ML MODEL OUTPUT | | |
|---|---|---|
| Start | 50 | |
| End | 69 | |
| Text | Acetylsalicylic acid | |
| Coreferences | Start | 150 |
| | End | 151 |
| | Text | It |
| | Start | 206 |
| | End | 214 |
| | Text | The drug |
| ... | | |

*FIG. 8B*

| ANALYTIC B | DICTIONARY |
|---|---|
| Start | 50 |
| End | 69 |
| Type | DrugOrMedicine |
| UID | X14 |
| Name | Acetylsalicylic acid |
| Synonyms | [Aspirin, ...] |
| ... | |

| COMPOSITE OUTPUT | | |
|---|---|---|
| UID | | |
| Name | Acetylsalicylic acid | |
| Start | 50 | |
| End | 69 | |
| Relations | [...] | |
| Synonyms | [Apirin, ...] | |
| Coreferences | Start | 150 |
| | End | 151 |
| | Text | It |
| | Start | 206 |
| | End | 214 |
| | Text | The drug |

US 11,475,325 B2

INFERRING COGNITIVE CAPABILITIES ACROSS MULTIPLE COGNITIVE ANALYTICS APPLIED TO LITERATURE

BACKGROUND

The present application relates generally to an improved data processing apparatus and method and more specifically to mechanisms for inferring cognitive capabilities across multiple cognitive analytics applied to literature.

Analytics is the discovery, interpretation, and communication of meaningful patterns in data. It also entails applying data patterns towards effective decision making. In other words, analytics can be understood as the connective tissue between data and effective decision making within an organization. Especially valuable in areas rich with recorded information, analytics relies on the simultaneous application of statistics, computer programming, and operations research to quantify performance.

Organizations may apply analytics to business data to describe, predict, and improve business performance. Specifically, areas within analytics include predictive analytics, prescriptive analytics, enterprise decision management, descriptive analytics, cognitive analytics, Big Data Analytics, retail analytics, supply chain analytics, store assortment and stock-keeping unit optimization, marketing optimization and marketing mix modeling, web analytics, call analytics, speech analytics, sales force sizing and optimization, price and promotion modeling, predictive science, credit risk analysis, and fraud analytics. Since analytics can require extensive computation, the algorithms and software used for analytics harness the most current methods in computer science, statistics, and mathematics.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions that are executed by the at least one processor and configure the at least one processor to implement an analytic inference engine for inferring cognitive capabilities across multiple cognitive analytics applied to literature. The method comprises receiving, by the analytic inference engine, cognitive analytic output generated by multiple cognitive analytics applied to a portion of content. The method further comprises responsive to the analytic inference engine finding a first offset in a first cognitive analytic output matching a second offset in a second cognitive analytic output, identifying unique features in the first cognitive analytic output and the second cognitive analytic output with respect to the matching offset. The method further comprises generating, by the analytic inference engine, a composite analytic output comprising the unique features with respect to the matching offset.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a block diagram of an analytics inference engine in accordance with an illustrative embodiment;

FIG. 5 is a block diagram of a literature search service in accordance with an illustrative embodiment;

FIG. 6 depicts example analytic output for two cognitive analytic engines for the same document in accordance with an illustrative embodiment;

FIGS. 7A-7C depict an example of matching offsets from multiple analytics in accordance with an illustrative embodiment;

FIGS. 8A-8D depict an example of inferring cognitive capabilities across multiple cognitive analytics applied to literature in accordance with an illustrative embodiment;

DETAILED DESCRIPTION

Figure 1:
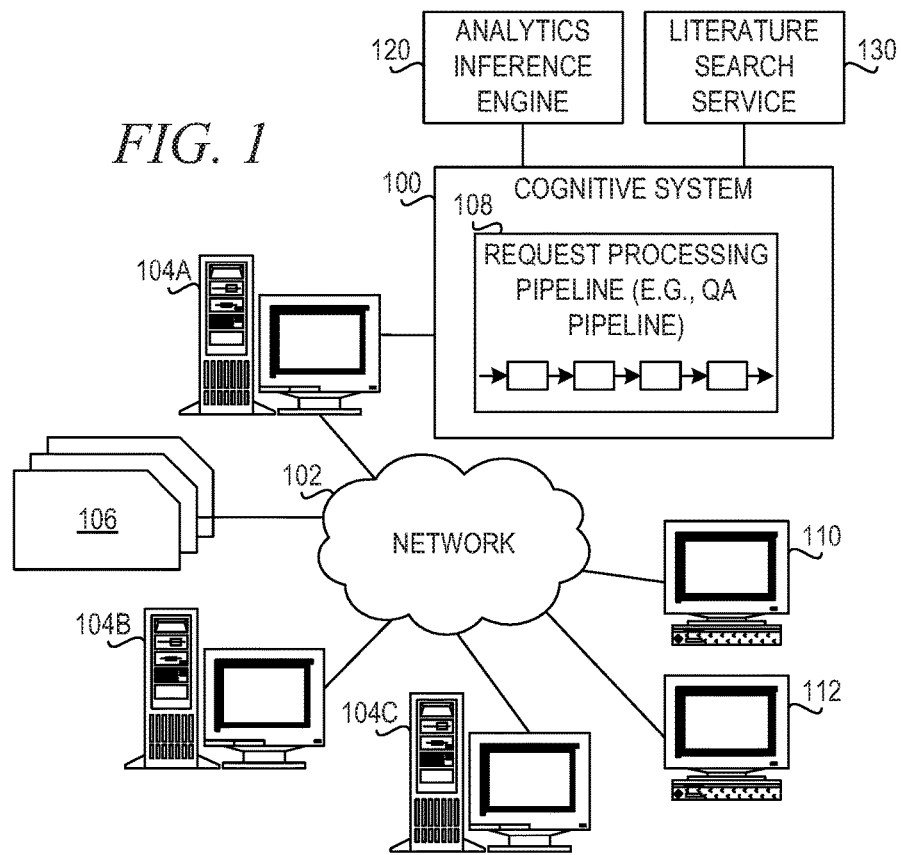
FIG. 1 depicts a schematic diagram of one illustrative embodiment of a cognitive healthcare system in a computer network.

Cognitive analytics are developed to provide a specific feature set requiring multiple analytics to be run. Each analytic has to provide the exact set of features required by a solution. Capabilities are not shared between cognitive analytics. Machine learning models can detect relations between semantic type categories only (e.g., drug treats symptom, condition, body part, etc.). Rule and dictionary analytics can find precise names of drugs, disease, body parts, etc., but are not strong in detecting whether a relation exists between two dictionary artifacts. It is desirable for literature searchers to have the ability to discover and search on relations for precise dictionary terms rather than broad categories. Each analytic must be engineered to provide the superset of all features that users need. Using multiple analytics requires each analytic to use the ontology of evidence source to produce the desired outcome.

The illustrative embodiment provides a mechanism for comparing cognitive analytic output from multiple contributors so capabilities provided from one analytic can be inferred for other analytics. The illustrative embodiment allows services to provide more granular searchable evidence by inferring concepts involved in relations giving users additional insights in finding relevant literature to review based on specific details they are interested in researching. Without inferring across analytic output, the user experience is limited to the capabilities of a single analytic, which may not produce the level of detail the user needs to retrieve a meaningful set of results when exploring literature.

An analytic is a model applied to data to produce a specific result. A model is a runtime engine for processing data to produce the result. As used herein, the term "dictionary analytic" refers to an analytic that uses a rule-based engine to find precise names of drugs, diseases, body parts, or other categories of terms or phrases in content. In contrast, a "relational analytic" uses a machine learning model discovering relations between semantic type categories (e.g., drug treats symptom, disease affects body part, etc.). An offset is a location of analytic output. For instance, a dictionary analytic specifics an offset as a start location and stop location within content that matches a particular concept. A relational analytic specifies a source offset and a target offset and specifies a relation between the source and the target.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general-purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular features or elements present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
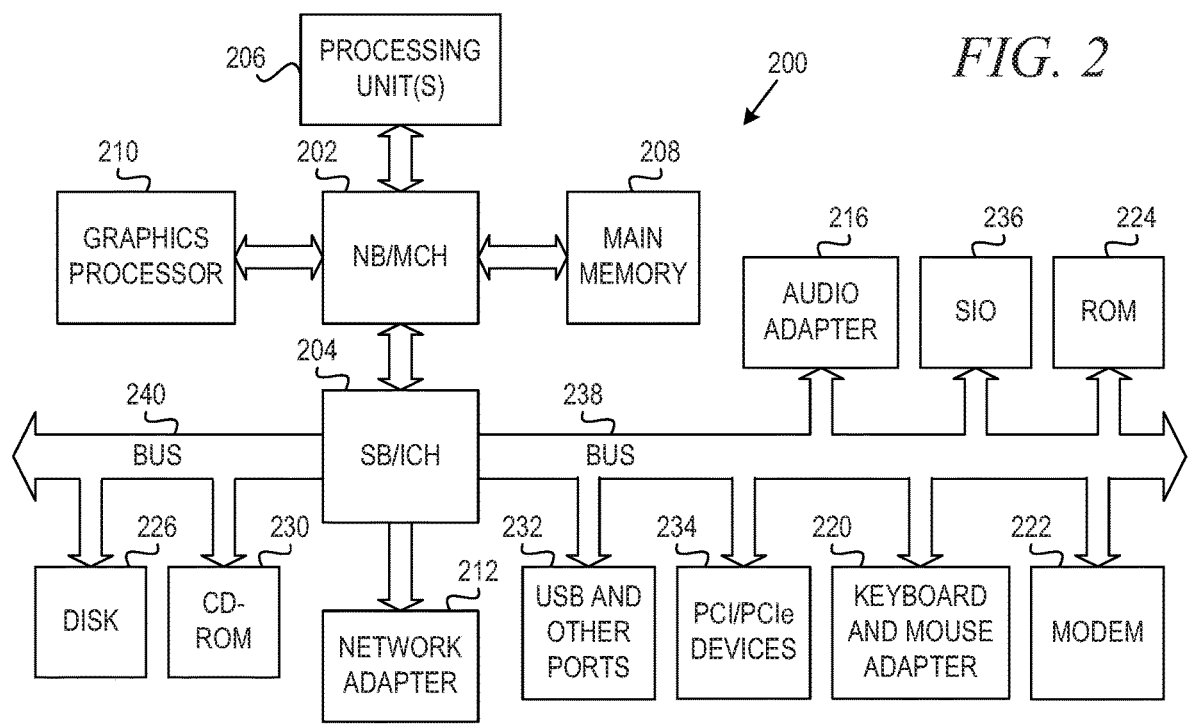
FIG. 2 is a block diagram of an example data processing system in which aspects of the illustrative embodiments are implemented.
Figure 3:
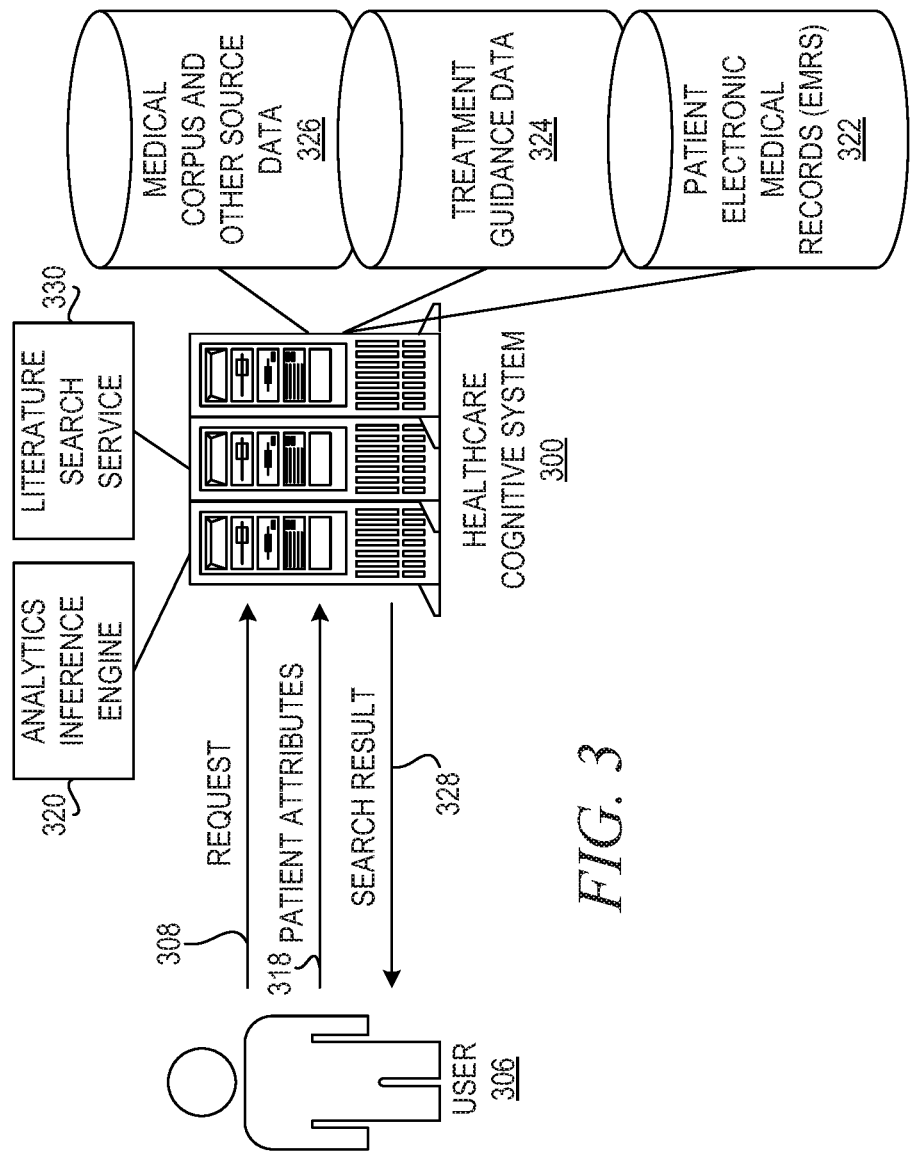
FIG. 3 is an example diagram illustrating an interaction of elements of a healthcare cognitive system in accordance with one illustrative embodiment.

As noted above, the present invention provides mechanisms for generating health care clinical data-controlled datasets. The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system for healthcare applications (also referred to herein as a "healthcare cognitive system") which implements a request processing pipeline (e.g., a literature search service), request processing methodology, and request processing computer program product with which the mechanisms of the illustrative embodiments are implemented. These requests may be provided as structured or unstructured request messages, natural language questions, or any other suitable format for requesting an operation to be performed by the healthcare cognitive system. As described in more detail hereafter, the particular healthcare application that is implemented in the cognitive system of the present invention is a healthcare application for presenting relevant information using a graphical presentation engine.

It should be appreciated that the healthcare cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests, depending on the desired implementation. For example, in some cases, a first request processing pipeline may be trained to operate on input requests directed to a first medical malady domain (e.g., various types of blood diseases) while another request processing pipeline may be trained to answer input requests in another medical malady domain (e.g., various types of cancers). In other cases, for example, the request processing pipelines may be configured to provide different types of cognitive functions or support different types of healthcare applications, such as one request processing pipeline being used for patient diagnosis, another request processing pipeline being configured for cognitive analysis of EMR data, another request processing pipeline being configured for patient monitoring, etc.

Moreover, each request processing pipeline may have its own associated corpus or corpora that it ingests and operates on, e.g., one corpus for blood disease domain documents and another corpus for cancer diagnostics domain related documents in the above examples. These corpora may include, but are not limited to, EMR data and other historical patient data.

As will be discussed in greater detail hereafter, the illustrative embodiments may be integrated in, augment, and extend the functionality of these request processing pipelines or other mechanisms of a healthcare cognitive system with regard to illustrative artificial intelligence for functional prognosis estimation. Thus, it is important to first have an understanding of how cognitive systems are implemented before describing how the mechanisms of the illustrative embodiments are integrated in and augment such cognitive systems and request processing pipeline mechanisms. It should be appreciated that the mechanisms described in FIGS. 1-3 are only examples and are not intended to state or imply any limitation with regard to the type of cognitive system mechanisms with which the illustrative embodiments are implemented. Many modifications to the example cognitive system shown in FIGS. 1-3 may be implemented in various embodiments of the present invention without departing from the spirit and scope of the present invention.

FIG. 1 depicts a schematic diagram of one illustrative embodiment of a cognitive system 100 implementing a request processing pipeline 108 in a computer network 102. The cognitive system 100 is implemented on one or more computing devices 104A-C (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-C. The network 102 includes multiple computing devices 104A-C, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 may provide cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, sub-systems, and/or devices other than those that are depicted herein.

The cognitive system 100 is configured to implement a request processing pipeline 108 that receive inputs from various sources. The requests may be posed in the form of a natural language question, natural language request for information, natural language request for the performance of a cognitive operation, or the like, and the answer may be returned in a natural language format maximized for efficient comprehension. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-C on the network 102 include access points for content creators and cognitive system users. Some of the computing devices 104A-C include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input requests to the cognitive system 100 that are processed based on the content in the corpus or corpora of data 106. In one embodiment, the requests are formed using natural language. The cognitive system 100 parses and interprets the request via a pipeline 108, and provides a response to the cognitive system user, e.g., cognitive system user 110, containing one or more answers to the question posed, response to the request, results of processing the request, or the like. In some embodiments, the cognitive system 100 provides a response to users in a ranked list of candidate responses while in other illustrative embodiments, the cognitive system 100 provides a single final response or a combination of a final response and ranked listing of other candidate responses.

The cognitive system 100 implements the pipeline 108, which comprises a plurality of stages for processing an input request based on information obtained from the corpus or corpora of data 106. The pipeline 108 generates responses for the input question or request based on the processing of the input request and the corpus or corpora of data 106.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the request, which in turn are then used to formulate queries that are applied to the corpus or corpora of data 106. Based on the application of the queries to the corpus or corpora of data 106, a set of hypotheses, or candidate responses to the input request, are generated by looking across the corpus or corpora of data 106 for portions of the corpus or corpora of data 106 (hereafter referred to simply as the corpus 106) that have some potential for containing a valuable response to the input request (hereafter assumed to be an input question). The pipeline 108 of the IBM Watson™ cognitive system then performs deep analysis on the language of the input question and the language used in each of the portions of the corpus 106 found during the application of the queries using a variety of reasoning algorithms.

The scores obtained from the various reasoning algorithms are then weighted against a statistical model that summarizes a level of confidence that the pipeline 108 of the IBM Watson™ cognitive system 100, in this example, has regarding the evidence that the potential candidate answer is inferred by the question. This process may be repeated for each of the candidate responses to generate a ranked listing of candidate responses, which may then be presented to the user that submitted the input request, e.g., a user of client computing device 110, or from which a final response is selected and presented to the user. More information about the pipeline 108 of the IBM Watson™ cognitive system 100 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson™ and How it Works" by Rob High, IBM Redbooks, 2012.

As noted above, while the input to the cognitive system 100 from a client device may be posed in the form of a natural language request, the illustrative embodiments are not limited to such. Rather, the input request may in fact be formatted or structured as any suitable type of request which may be parsed and analyzed using structured and/or unstructured input analysis, including but not limited to the natural language parsing and analysis mechanisms of a cognitive system such as the IBM Watson™ cognitive system, to determine the basis upon which to perform cognitive analysis and providing a result of the cognitive analysis. In the case of a healthcare based cognitive system, this analysis may involve processing patient medical records, medical guidance documentation from one or more corpora, and the like, to provide a healthcare oriented cognitive system result.

In the context of the present invention, cognitive system 100 may provide a cognitive functionality for assisting with healthcare-based operations. For example, depending upon the particular implementation, the healthcare based operations may comprise patient diagnostics medical practice management systems, personal patient care plan generation and monitoring, patient electronic medical record (EMR) evaluation for various purposes, such as for identifying patients that are suitable for a medical trial or a particular type of medical treatment, or the like. Thus, the cognitive system 100 may be a healthcare cognitive system 100 that operates in the medical or healthcare domains and which may process requests for such healthcare operations via the request processing pipeline 108 input as either structured or unstructured requests, natural language input questions, or the like.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for analytics inference engine 120 for inferring cognitive capabilities across multiple cognitive analytics applied to literature and literature search service 130 for performing literature search based on the inferred cognitive capabilities of the cognitive analytics.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements a cognitive system 100 augmented to include the additional mechanisms of the illustrative embodiments described hereafter.

In the depicted example, data processing system 200 employs a hub architecture including North Bridge and Memory Controller Hub (NB/MCH) 202 and South Bridge and Input/Output (I/O) Controller Hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 is an example diagram illustrating an interaction of elements of a healthcare cognitive system in accordance with one illustrative embodiment. The example diagram of FIG. 3 depicts an implementation of a healthcare cognitive system 300 that is configured to infer cognitive capabilities across multiple cognitive analytics applied to literature. However, it should be appreciated that this is only an example implementation and other healthcare operations may be implemented in other embodiments of the healthcare cognitive system 300 without departing from the spirit and scope of the present invention.

Moreover, it should be appreciated that while FIG. 3 depicts the user 306 as a human figure, the interactions with user 306 may be performed using computing devices, medical equipment, and/or the like, such that user 306 may in fact be a computing device, e.g., a client computing device. For example, interactions between the user 306 and the healthcare cognitive system 300 will be electronic via a user computing device (not shown), such as a client computing device 110 or 112 in FIG. 1, communicating with the healthcare cognitive system 300 via one or more data communication links and potentially one or more data networks.

As shown in FIG. 3, in accordance with one illustrative embodiment, the user 306 submits a request 308 to the healthcare cognitive system 300, such as via a user interface on a client computing device that is configured to allow users to submit requests to the healthcare cognitive system 300 in a format that the healthcare cognitive system 300 can parse and process. The request 308 may include, or be accompanied with, information identifying patient attributes 318. These patient attributes 318 may include, for example, an identifier of the patient 302, social history, and demographic information about the patient, symptoms, and other pertinent information obtained from responses to questions or information obtained from medical equipment used to monitor or gather data about the condition of the patient. In one embodiment, patient attributes 318 may include identification of a biomedical image for processing to detect anomalies. Any information about the patient that may be relevant to a cognitive evaluation of the patient by the healthcare cognitive system 300 may be included in the request 308 and/or patient attributes 318.

The healthcare cognitive system 300 provides a cognitive system that is specifically configured to perform an implementation specific healthcare oriented cognitive operation. In the depicted example, this healthcare oriented cognitive operation is directed to providing a literature search result 328 to the user 306 to assist the user 306 in treating the patient based on their reported symptoms and other information gathered about the patient. The healthcare cognitive system 300 operates on the request 308 and patient attributes 318 utilizing information gathered from the medical corpus and other source data 326, treatment guidance data 324, and the patient EMRs 322 associated with the patient to generate literature search results 328. In accordance with the illustrative embodiments, literature search results 328 are generated based on inferred cognitive capabilities across multiple cognitive analytics.

In accordance with the illustrative embodiments herein, the healthcare cognitive system 300 is augmented to include analytics inference engine 320 for inferring cognitive capabilities across multiple cognitive analytics applied to literature and literature search service 330 for performing literature search based on the inferred cognitive capabilities of the cognitive analytics. Analytics inference engine 320 allows analytics services to provide more granular searchable evidence by inferring concepts involved in relations giving users additional insights in finding relevant medical literature to review based on the specific details of interest. Without inferring across analytic output, the experience of using literature search service 330 is limited to the capabilities of a single analytic, which may not produce the level of detail the user needs in order to retrieve a meaningful set of results when exploring literature.

FIG. 4 is a block diagram of an analytics inference engine in accordance with an illustrative embodiment. Analytics inference engine 410 receives analytic output 401 from multiple cognitive analytics. The trained model data 420 and ontological dictionary data 425 are inputs to the specific analytics configured to use the data. Artifacts of the data will be output of the analytics when used to analyze text. That analyzed output become search and retrieve data for solutions like literature search or patient history analyzers.

Analytics inference engine 410 includes matching component 411, feature identification component 412, and composite output builder 413. Matching component 411 finds exact offset matches across cognitive analytics output 401 to enhance the cognitive insights an analytic provides making it easier for solutions to provide comprehensive, deep understanding of content. For example, one analytic may determine relations between terms, but the relations are scoped to a broad category, such as "drug controls body function." The relational analytic does not provide the granularity of being able to look at relations for a specific drug and what the drug treats. However, another analytic identifies distinct drugs and diseases. Matching component 411 matches exact offsets of the two analytics to allow solutions to derive relations from specific datasets produced by an analytic.

Feature identification component 412 identifies unique features in the matching analytics with respect to the matching offsets. For example, for a given matching offset in a dictionary analytic, feature identification component 412 may identify the text of the offset in the content and a type of the text being identified. Also, feature identification component 412 may identify the same offset as a source or target of a relation, a type of the source, a type of the target, and a type of the relation. Feature identification component 412 may also identify other unique features beyond these examples.

Composite output builder 413 compiles the features from the matching analytics into a composite output 415. For example, for an offset matching a dictionary analytic and a relational analytic, the composite analytic output 415 may include the text of the offset, type of the offset, and other features from the dictionary analytic (e.g., synonyms, definition, etc.), as well as the type of relation, source offset, target offset, and other features from the relational analytic (e.g., a score associated with the relation).

FIG. 5 is a block diagram of a literature search service in accordance with an illustrative embodiment. Literature search service 510 receives a search request 501 to search content 520. Based on the matching annotation offsets from the two cognitive analytics in composite analytic output 502, literature search service 510 can infer and offer more discrete concepts as suggested search suggestions. The inference engine takes into account the type associated with the annotations to filter out potential false positives. Literature search service 510 then uses composite output 502 to follow matching offsets to infer further information to include in search result 515.

FIG. 6 depicts example analytic output for two cognitive analytic engines for the same document in accordance with an illustrative embodiment. Analytic output 610 is generated by a relational analytic. Analytic output 610 specifies a relation between a target and a source, where the relation, the target, and the source have a type. In the depicted example, the relation specifies a drug controls a body function. The source and the target have specific offsets (start and stop) in the content. Analytic output 620 specifies a term or phrase by an offset (start and stop). The term or phrase has a specific text.

In example shown in FIG. 6, a word vector analysis may verify drug and pharmacologic substances have a high confidence score for a match. In contrast, drug and a more generic type would have a low confidence score and be filtered out of the inferred concepts. With the relational analytic the options are limited to the type categories for the relation, source, and target. However, by matching offsets across analytic output, specific concepts can be inferred to be associated with the relation allowing the user to search for specific evidence like what body functions defined in the relational analytic output that will provide more discrete concepts for body functions like blood pressure, diabetes, etc., thus allowing the user to search for drugs that control blood pressure. Users can also target a specific relation to discover documents that discuss how Captopril, in the example of FIG. 6, controls hypertension (body function) without having to sort through a result set of several drugs controlling several body functions.

Figure 7A:
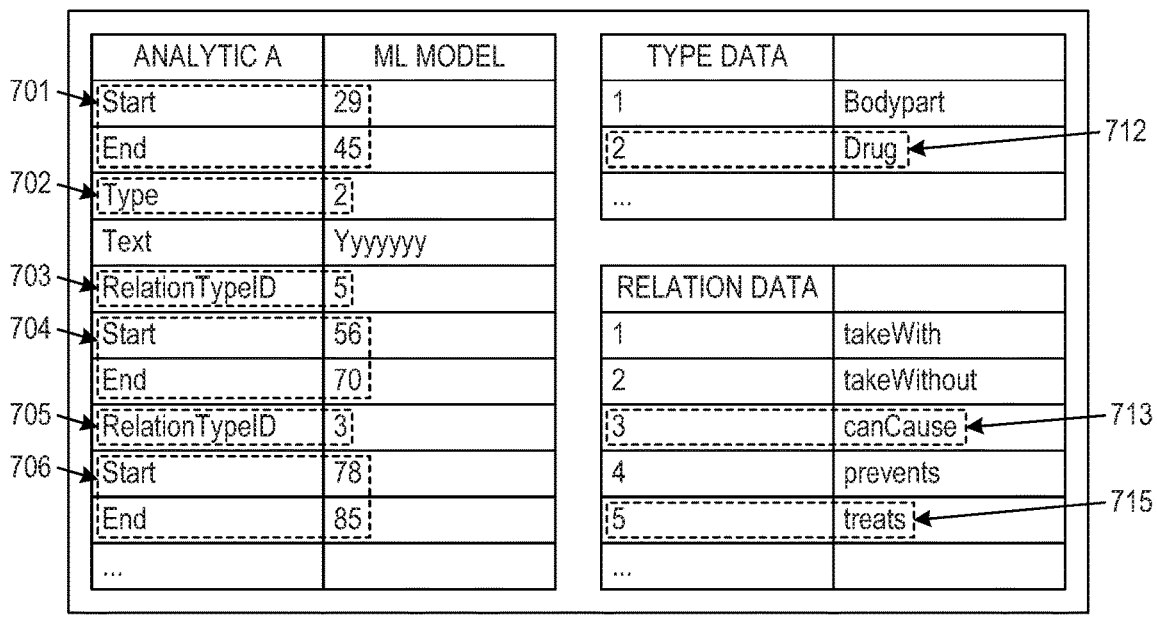
Figure 7B:
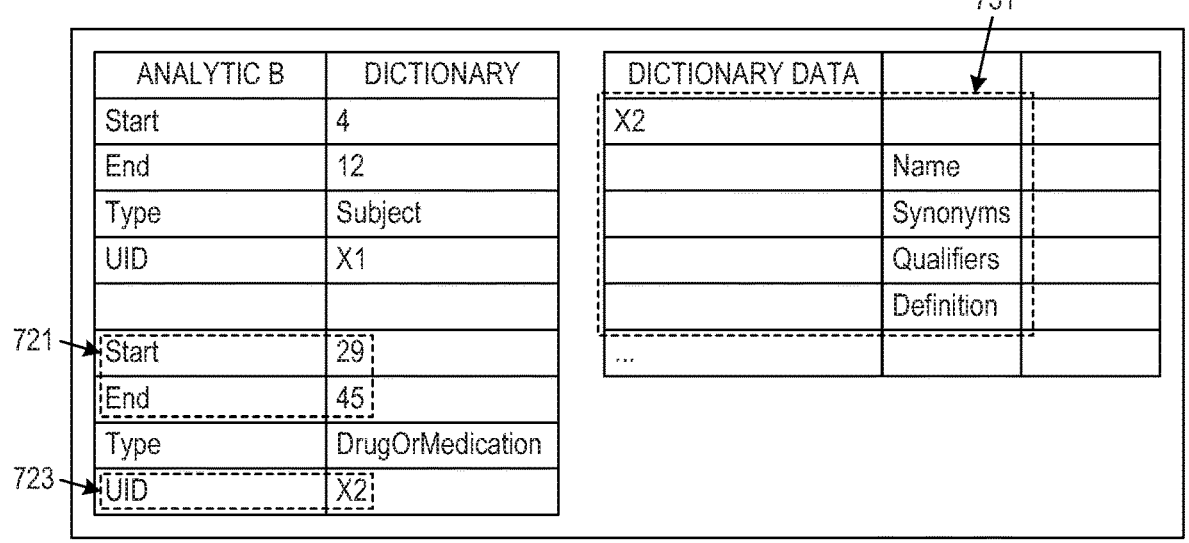

FIGS. 7A-7C depict an example of matching offsets from multiple analytics in accordance with an illustrative embodiment. The inference engine analyzes all analytic output produced over a piece of content, looks for matching annotations, and builds a composite annotation of unique features provided by the analytic model. FIG. 7A depicts an example output for a relational analytic including source offset 701, source type 702, relation type 703 for target offset 704, and relation type 705 for target offset 706. In this example, the source offset 701 has a first relation with target offset 703 and a second relation with target offset 705.

FIG. 7A also depicts the type data for the source offset 701. The source type 702 refers to type 712. That is the content at source offset 701 is of type "drug. In addition, FIG. 7A depicts the relation data, which maps relation type identifiers with relation types. In the depicted example, relation 703 is of type "treats" and relation 705 is of type "can cause." Thus, the source offset 701 of type "drug" treats target offset 704 and can cause target offset 705.

FIG. 7B depicts an example output for a dictionary analytic including offset 721 with identifier 723. FIG. 7B also depicts dictionary data 731 that maps the identifier 723 to dictionary data including name, synonyms, qualifiers, and definition.

FIG. 7C depicts an example composite analytic output including the identifier, name, offset, relations, synonyms, qualifiers, and definition. The composite output can provide further insights about a cognitive output artifact without the consumer needing to understand the various models being applied. When applied to literature search, the search engine can expose inferred data as evidence to enhance the user experience, allowing any synonym of an item to be involved in a relationship discovery versus the exact text from a trained model.

Figures 8C, 8D:
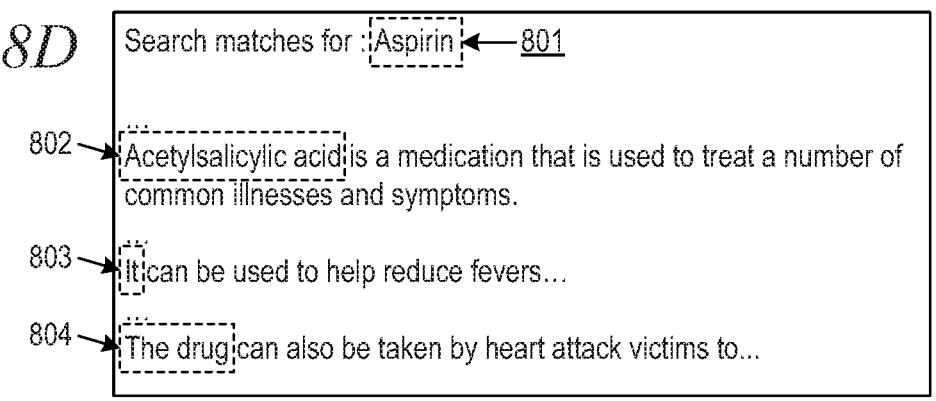

FIGS. 8A-8D depict an example of inferring cognitive capabilities across multiple cognitive analytics applied to literature in accordance with an illustrative embodiment. FIG. 8A depicts machine learning (ML) model output including a source offset with corresponding text and a plurality of coreferences including target offsets and corresponding text. FIG. 8B depicts dictionary analytic output including an offset, type, identifier, name, synonyms, and other dictionary data. More specifically, the dictionary analytic output in FIG. 8B specifies synonyms including "aspirin." FIG. 8C depicts composite analytic output including features from both the ML model output of FIG. 8A and the dictionary analytic output of FIG. 8B.

When applied to literature search, the search engine can expose inferred data as evidence to enhance the user experience, allowing users to see inferred coreference matches the dictionary analytic would not annotate. FIG. 8D depicts example literature search result based on the composite analytic output of FIG. 8C. In the depicted example, the literature search result includes search matches for the term "aspirin" 801. The search results include a passage from the content containing the synonym "acetylsalicylic acid" 802, a passage from the content containing a first coreference "it" 803, and a passage containing a second coreference "the drug" 804. These inferred coreference matches are based on the matching offset found by the analytic inference engine.

Figure 9:
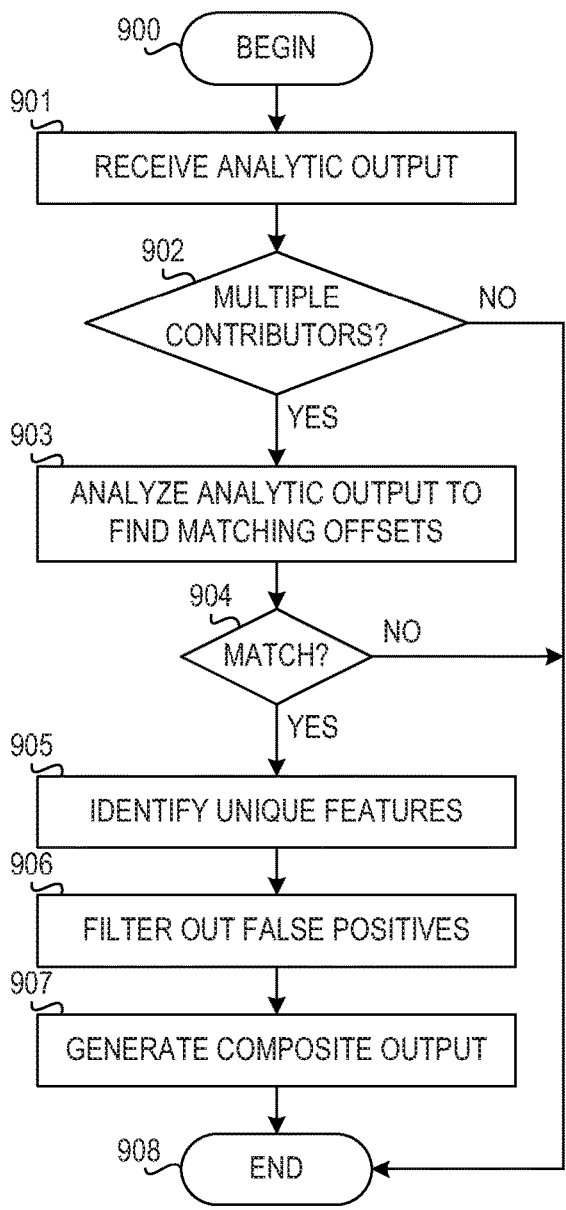
FIG. 9 is a flowchart illustrating operation of an analytic inference engine in accordance with an illustrative embodiment.

FIG. 9 is a flowchart illustrating operation of an analytic inference engine in accordance with an illustrative embodiment. Operation begins (block 900), and the inference engine receives analytic output (block 901). The inference engine determines whether there are multiple contributors to the analytic output (block 902). If there are not multiple contributors, then operation ends (block 908).

If there are multiple contributors to the analytic output in block 902, then the inference engine analyzes the analytic output to find matching offsets (block 903). If the inference engine does not find at least one offset match in (block 904), then operation ends (block 908).

If the inference engine finds at least one offset match in block 904, then the inference engine identifies unique features in the analytic output with respect to the matching offset (block 905). The inference engine filters out false positives (block 906). The inference engine then generates a composite output (block 907). Thereafter, operation ends (block 908).

Figure 10:
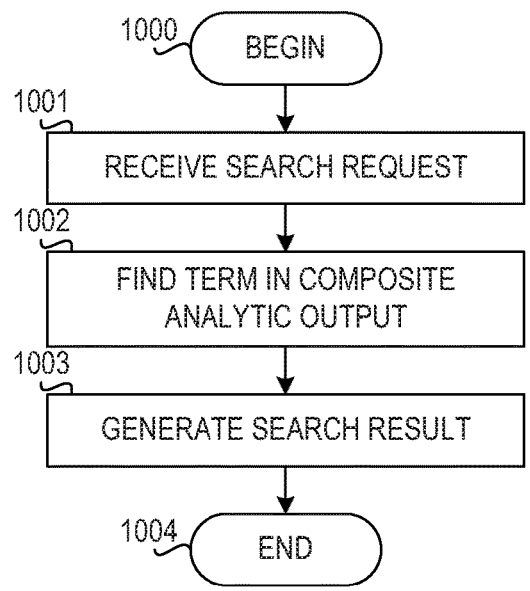
FIG. 10 is a flowchart illustrating operation of a literature search service in accordance with an illustrative embodiment.

FIG. 10 is a flowchart illustrating operation of a literature search service in accordance with an illustrative embodiment. Operation begins (block 1000), and the literature search service receives a search request to search matches for a term (block 1001). The literature search service finds the term in the composite analytic output (block 1002). The literature search service then generates search results based on the composite analytic output (block 1003). Thereafter, operation ends (block 1004).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor and configure the at least one processor to implement an analytic inference engine for inferring cognitive capabilities across multiple cognitive analytics applied to literature, the method comprising:
   receiving, by the analytic inference engine, cognitive analytic output generated by multiple cognitive analytics applied to a portion of content;
   responsive to the analytic inference engine finding a first offset in a first cognitive analytic output matching a second offset in a second cognitive analytic output, identifying unique features in the first cognitive analytic output and the second cognitive analytic output with respect to the matching offset; and
   generating, by the analytic inference engine, a composite analytic output comprising the unique features with respect to the matching offset, wherein the first cognitive analytic output is generated by a dictionary analytic and the second cognitive analytic output is generated by one of a relational analytic or a coreference analytic.

2. The method of claim 1, further comprising performing a literature search based on the composite analytic output.

3. The method of claim 2, wherein performing the literature search comprises receiving a search request to search a corpus of literature for a search term, finding the search term in the composite analytic output, and generating a search result based on the composite analytic output.

4. The method of claim 1, wherein the second cognitive analytic output is generated by the relational analytic.

5. The method of claim 4, wherein the first cognitive analytic output comprises a type, a name, one or more synonyms, one or more qualifiers, and a definition.

6. The method of claim 5, wherein the second cognitive analytic comprises a source offset, a source type, a target offset, and a relation type.

7. The method of claim 6, wherein the composite analytic output comprises a name, an offset, one or more relations, one or more synonyms, one or more qualifiers, and a definition.

8. The method of claim 1, wherein the second cognitive analytic output is generated by the coreference analytic.

9. The method of claim 8, wherein the second cognitive analytic output comprises a source offset, a source text, a target offset, and a target text.

10. The method of claim 1, wherein the composite analytic output comprises a name, a source offset, one or more relations, one or more synonyms, and one or more coreferences.

11. A computer program product comprising a computer readable storage medium having a computer readable program stored therein, wherein the computer readable program, when executed on a data processing system, causes the data processing system to implement an analytic inference engine for inferring cognitive capabilities across multiple cognitive analytics applied to literature, wherein the computer readable program causes the data processing system to:
receive, by the analytic inference engine, cognitive analytic output generated by multiple cognitive analytics applied to a portion of content;
responsive to the analytic inference engine finding a first offset in a first cognitive analytic output matching a second offset in a second cognitive analytic output, identify unique features in the first cognitive analytic output and the second cognitive analytic output with respect to the matching offset; and
generate, by the analytic inference engine, a composite analytic output comprising the unique features with respect to the matching offset, wherein the first cognitive analytic output is generated by a dictionary analytic and the second cognitive analytic, output is generated by one of a relational analytic or a coreference analytic.

12. The computer program product of claim 11, wherein the computer readable program causes the data processing system to perform a literature search based on the composite analytic output.

13. The computer program product of claim 12, wherein performing the literature search comprises receiving a search request to search a corpus of literature for a search term, finding the search term in the composite analytic output, and generating a search result based on the composite analytic output.

14. The computer program product of claim 11, wherein the second cognitive analytic output is generated by the relational analytic.

15. The computer program product of claim 14, wherein the first cognitive analytic output comprises a type, a name, one or more synonyms, one or more qualifiers, and a definition.

16. The computer program product of claim 15, wherein the second cognitive analytic comprises a source offset, a source type, a target offset, and a relation type.

17. The computer program product of claim 16, wherein the composite analytic output comprises a name, an offset, one or more relations, one or more synonyms, one or more qualifiers, and a definition.

18. The computer program product of claim 11, wherein the second cognitive analytic output is generated by the coreference analytic.

19. The computer program product of claim 11, wherein the composite analytic output comprises a name, a source offset, one or more relations, one or more synonyms, and one or more coreferences.

20. An apparatus comprising:
at least one processor; and
at least one memory coupled to the at least one processor, wherein the at least one memory comprises instructions which, when executed by the at least one processor, cause the at least one processor to implement an analytic inference engine for inferring cognitive capabilities across multiple cognitive analytics applied to literature, wherein the instructions cause the processor to:
receive, by the analytic inference engine, cognitive analytic output generated by multiple cognitive analytics applied to a portion of content;
response to the analytic inference engine finding a first offset in a first cognitive analytic output matching a second offset in a second cognitive analytic output, identify unique features in the first cognitive analytic output and the second cognitive analytic output with respect to the matching offset; and
generate, by the analytic inference engine, a composite analytic output comprising the unique features with respect to the matching offset, wherein the first cognitive analytic output is generated by a dictionary analytic and the second cognitive analytic output is generated by one of a relational analytic or a coreference analytic.

* * * * *